(12) United States Patent
Mastro

(10) Patent No.: US 8,600,022 B2
(45) Date of Patent: *Dec. 3, 2013

(54) SYSTEM AND METHOD FOR PROVIDING AN ANTI-MARKETING FEATURE IN A NETWORK

(76) Inventor: Michael P. Mastro, Huntington Beach, CA (US)

(*) Notice: Subject to any disclaimer, the term of this patent is extended or adjusted under 35 U.S.C. 154(b) by 1583 days.

This patent is subject to a terminal disclaimer.

(21) Appl. No.: 11/799,209

(22) Filed: Apr. 30, 2007

(65) Prior Publication Data

US 2007/0201650 A1     Aug. 30, 2007

Related U.S. Application Data

(63) Continuation-in-part of application No. 09/707,571, filed on Nov. 6, 2000, now Pat. No. 7,212,620.

(51) Int. Cl.
*H04M 1/56* (2006.01)

(52) U.S. Cl.
USPC .................. 379/142.06; 379/142.02

(58) Field of Classification Search
USPC ........................ 379/142.02, 142.06
See application file for complete search history.

(56) References Cited

U.S. PATENT DOCUMENTS

| | | | |
|---|---|---|---|
| 5,751,800 A * | 5/1998 | Ardon | 379/134 |
| 5,805,686 A * | 9/1998 | Moller et al. | 379/198 |
| 6,031,899 A * | 2/2000 | Wu | 379/142.01 |
| 6,259,779 B1 * | 7/2001 | Council et al. | 379/121.01 |
| 6,459,780 B1 * | 10/2002 | Wurster et al. | 379/142.02 |
| 6,519,332 B1 * | 2/2003 | Tovander | 379/196 |
| 2002/0012426 A1 * | 1/2002 | Gupton | 379/210.02 |

* cited by examiner

*Primary Examiner* — Mohammad Islam
*Assistant Examiner* — Van D Huynh
(74) *Attorney, Agent, or Firm* — Roy L. Anderson; Wagner, Anderson & Bright PC

(57) ABSTRACT

A system and method for minimizing unsolicited marketing communications to subscribers in a subscription base obtains a contacting party identification for incoming communications to a selected contact point before communications are allowed to pass through to selected contact points. Next, contacting party identification is compared with a marketing database to determine if there is a match. If there is a match, a preselected action other than completing the incoming communication is taken or incoming communication is completed if an override condition is set. If there is no match, incoming communication is passed through and the subscriber can designate it as an unwanted marketing communication if a preselected criterion for addition is met once more than one subscriber identifies the contacting party identification as a potential marketing communication. The entries in the marketing database can be periodically deleted over time and then readded to the marketing database once the preselected criterion for addition has been met so as to refresh the database and keep it from becoming stale. A subscriber can access a customized subscriber database to selectively vary one or more override conditions.

11 Claims, No Drawings

SYSTEM AND METHOD FOR PROVIDING AN ANTI-MARKETING FEATURE IN A NETWORK

CROSS-REFERENCE TO RELATED APPLICATIONS

The present application is a continuation-in-part application of U.S. patent application Ser. No. 09/707,571, filed Nov. 6, 2000, and issued as U.S. Pat. No. 7,212,620 on May 1, 2007, the disclosure of which is specifically incorporated herein by reference.

FIELD OF THE INVENTION

The present invention relates generally to networks, and more specifically to a way of providing an anti-marketing feature to multiple subscribers.

BACKGROUND OF THE INVENTION

In my prior application I described problems associated with unwanted telemarketing calls and described a procedure by which such calls can be lessened for a subscription database. In connection with that disclosure I also described a unique method and system useful for populating a database of telemarketers that can be used to block or selectively block such calls.

The present application is directed to using the very same method and system to block other unwanted marketing (or other unsolicited) communications in other media. Thus, for example, the same methodology and system can be employed to block electronic communications (such as e-mail) or text messages or other communications that are becoming more and more prevalent with time as technology inexorably marches forward.

SUMMARY OF THE INVENTION

The present invention is generally directed to a method for minimizing unsolicited marketing communications to a plurality of subscribers in a subscription base by obtaining a contacting party identification for an incoming communication to a selected contact point of a subscriber in the subscription base before the incoming communication is allowed to pass through to the selected contact point, comparing the contacting party identification with a marketing database to determine if there is a match and then, if there is a match, either taking a preselected action other than completing the incoming communication or completing the incoming communication if an override condition is set, or, if there is no match, completing the incoming communication, keeping a record of the contacting party identification, allowing the subscriber to designate the incoming communication as a marketing communication, and adding the contacting party identification into the marketing database if a preselected criterion for addition is met once more than one subscriber identifies the contacting party identification as a potential marketing communication.

In a first, separate aspect of the present invention, a portion of the plurality of marketing contacting party identifications in the marketing database are periodically deleted and then readded to the marketing database once the preselected criterion for addition has been met.

In another, separate aspect of the present invention, a subscriber can access a customized subscriber database via a computer and selectively vary one or more override conditions, including varying an override condition for a selected group of marketing contacting party identifications.

In still another, separate aspect of the present invention, a computer network and an anti-marketing system for use in a network have a subscription base of subscribers, a logical marketing database with marketing contacting party identifications, a subscriber marketing identification mechanism that allows a subscriber to identify a contacting party identification as a potential marketing contact, and marketing identification logic that adds the potential marketing contact to the logical marketing database as a marketing contacting party identification if a preselected criterion for addition is met once more than one subscriber identifies the potential marketing contact as a potential marketing contact, while a control system takes a preselected action other than completing a communication when an incoming communication to any of the plurality of subscriber contact points is identified as being from any of the marketing contacting party identifications and an override condition is not set.

In yet another, separate aspect of the present invention, marketing database control logic deletes a preselected portion of the plurality of marketing contacting party identifications from the logical marketing database after a given time interval.

Accordingly, it is a primary object of the present invention to provide a system and method for providing an anti-marketing feature in a network.

This and further objects and advantages will be apparent to those skilled in the art in connection with the drawings and the detailed description of the preferred embodiment set forth below.

DETAILED DESCRIPTION OF THE INVENTION

In accordance with the present invention, before a communication is completed or allowed to pass through to a selected contact point, whether it be a telephone number or some other communication address, such as an email address, an anti-marketing program is used to determine how the communication should be handled. The anti-marketing program can reside in one or more locations, depending upon designer preference and the system and manner in which it is being used. In an especially preferred embodiment, the anti-marketing program compares the contacting party identification of an incoming communication to a marketing database that contains known marketing contacting party identifications (e.g., known domains associated with spammers or marketers) to determine if there is a match between the contacting party identification and any of the marketing numbers contained in the marketing database. This can be done as part of a computer network system, or any other system that will allow the same function to be performed during network communications. If there is a match, the communication is prevented from passing through to the destination contact point (such as an e-mail address or text message address) unless an override condition is set, which will be described later.

Although it would be nice if all communication addresses used for marketing communications were included within a comprehensive static database, or at least within a comprehensive database updated as new communication addresses are used for marketing, this is not likely to ever occur. Of course, if marketers were ever forced to include their communication address in such a database, or only make marketing communications from addresses identifiable as such, e.g., a marketing exchange much like current toll free 800 and 888 exchanges, then such a database could easily become a reality. Another type of database that might be generated is a marketing database in which marketers voluntarily place their addresses in the database.

A marketing database can also be generated over time based upon simple addition of marketing contacting party identifications to the database as they become identified as marketing contacting party identifications. As the database grows in size, it becomes more accurate, more valuable, and more likely to correctly identify marketing contacting party identifications. In addition, to prevent the database from becoming stale, it can be periodically revalidated, or regenerated, at preselected intervals. For example, one third of the database might be deleted after a given time interval, such as sixty days. Although this will delete active marketing numbers from the database, it will also delete marketing contacting party identifications that may no longer be marketing contacting party identifications from the database, and marketing contacting party identifications that are still marketing contacting party identifications will then be reidentified and readded to the database.

Although it is especially preferred that that the marketing database contain marketing contacting party identifications, it is also possible that the marketing database might be constructed so as to contain non-marketing contacting party identifications so that marketing communications would be identified by not being in the database. Alternatively, the marketing database might contain two types of data, marketing contacting party identifications known to be marketing party identifications and party identifications known not to be marketing party identifications (e.g., police, government agencies, long used corporate or residential party identifications, etc.). Such a database offers the additional advantage of insuring that selected communications are not erroneously identified as marketing communications.

In accordance with the present invention, individual users of the system can be empowered to add offending marketing contacting party identifications to a marketing database. This methodology capitalizes on the fact that the preferred embodiments are especially well suited to block, or at least selectively screen, marketing communications to a large number of individual contact points. As the number of individual contact points included within the system or its methodology increases, because such communications can be part of a regular and ongoing process of updating the database of known marketing numbers, it is statistically less likely that a given marketer will actually pass through to a given contact point included within the system.

For ease of reference, an individual user of the system and method of the preferred embodiments will hereinafter be referred to as a subscriber contact point, while groups of subscriber contact points will be referred to as a subscription base. Although it is preferred that individual subscriber contact points pay for use of the present invention, a non-paying contact point included within the system would still be considered a "subscription contact point."

A marketer can use a network or some alternate communications method to initiate a marketing communication. When the communication reaches a subscriber in the subscription base and the contacting party identification associated with the communication does not match a marketing contacting party identification contained in the marketing database, the communication will be completed without invoking a preselected action other than completing the communication to the selected contact point. "Completing" the communication means that the communication will continue to be processed and that it will be allowed to pass through to the selected contact point, provided some other procedure or feature is not invoked to block the communication (such as, for example, blocking all communications at certain times or blocking communications from certain originating sources such as, for example, a particular server or IP address). If the marketing communication is received by a subscriber, the subscriber can identify the communication as a marketing communication after the communication is completed, and the communicating party identification associated with the communication can be added to the marketing database if one or more preselected criteria for addition to the marketing database are met.

If a subscriber does receive a communication from a marketer, the subscriber can identify the communication as such by taking a preselected action following the communication. This might be done, for example, by forwarding the communication to a central location so that the communicating party identification associated with the received communication can be processed to determine if it should be added to the marketing database.

Many different preselected criteria can be used for deciding whether a communicating party identification identified by a subscriber as a marketing contacting party identification should be added to the marketing database. Use of such criteria can be automated, through a computer program, and one or more algorithms can be used to implement logic, artificial intelligence, independent verification, or some other means, or a combination of such means, to confirm that a given communication party identification belongs to a marketer or is being used for marketing activity. For example, once a single subscriber identifies a single communication party identification as belonging to a marketer, a third party could contact the identified communication party identification to confirm that it does in fact belong to a marketer. Although this methodology might appear simple upon initial analysis, it is labor intensive, and therefore expensive. To minimize such expense, in an especially preferred embodiment, suspected marketing calling party identifications are saved in a separate file until further confirmation is obtained. If the marketing contacting party identification is identified as a marketer by a preselected number of different subscribers within a specified time, it will be identified as belonging to a marketer. Or, if the number passes an initial threshold, it might be targeted for independent verification. And, if any pattern begins to emerge concerning such numbers (e.g., maybe a number of the numbers are concentrated within a certain server or domain address), such information can be used to more readily identify additional marketing contacting party identifications. Accordingly, as will be readily apparent to one of ordinary skill in the art in possession of the present disclosure, there are many ways to determine how marketing contacting party identifications should be identified and added to the marketing database based upon input from subscribers.

If a subscriber receives a communication from a marketer that is contained within the marketing database, the communication can be terminated by taking a preselected action other than passing the communication to the selected contact point. For example, the marketer could be sent a communication that the selected contact point is no longer valid or active. Alternatively, the marketer can be provided with a communication notifying the marketer that the subscriber at the selected contact point does not accept communications from marketers and be told that the marketer should not attempt to make any future communications to that contact point. If the latter action is invoked, a record can be generated to indicate that the message has been given to the marketing contacting party identification that communicated with the subscriber contact point, and an anti-marketing flag indicating such could be triggered in a database file. By checking for such flags, it is possible to identify when the same marketing contacting party communicates with the subscriber contact point again despite having received an anti-marketing message. Should this occur, a predetermined course of action might be taken against the marketer. Depending upon the circumstances, such action might include reporting the second communication to an appropriate authority (if such a repeat communication is prohibited), or preventing the marketer from communicating with any subscriber even if certain subscribers previously indicated a willingness to receive a communication from the marketer by triggering an override condition for the marketer.

The concept of an override condition in a logical marketing database adds a great deal of flexibility and versatility to the system and methodology and permits the concepts of targeted marketing and selective blocking. Conceptually, an override condition could be triggered for a given marketing contacting party identification, a group of marketing contacting party identifications, or be tied to a given characteristic. Somebody other than a subscriber, such as a party operating the system, might trigger an override condition. Alternatively, a subscriber might trigger an override condition.

The party operating the system might want the ability to invoke a control system override to allow one or more marketing contacting party identifications contained in the marketing database to have access to one or more subscriber contact points. One use of this is to collect revenue from marketers granted this access. Another use of this is to identify subscribers willing to accept communications from certain marketers, or under certain conditions. For example, subscribers willing to subject themselves to marketing communications under certain circumstances might be given free service, a reduction in their service cost, or they might even be paid for considering such communications.

An individual subscriber might want the ability to invoke an override condition for several reasons. For example, the subscriber might receive incentives to do so. Alternatively, the subscriber might want to be able to receive certain types of marketing communications, such as communications soliciting money for a favorite charity, or communications promoting specific goods or services. There might also be personal reasons why a subscriber might want to accept a certain marketing call, such as when the subscriber knows that a friend or relative is engaged in marketing activities, and the subscriber wants to receive communications from the friend or relative from the marketing contacting party identification also being used for marketing activities.

One way to allow an individual subscriber to accept selected marketing communications is to allow the subscriber to create a customized subscriber database generated, at least in part, from the marketing database. The subscriber database might be customized by selectively varying one or more override conditions for at least one marketing contacting party identification contained within the customized subscriber database. The subscriber might access the customized subscriber database through any number of means, including computer access through a network, such as the Internet.

Although the foregoing description is illustrative of preferred embodiments of the present invention, it is to be understood that additional embodiments thereof will be obvious to those skilled in the art. For example, although the preferred embodiments are described in the context of being used to thwart marketing communications, they could also be used to thwart unsolicited personal communications, such as spam and unwanted text mail on cell phones or personal digital assistant (PDA).

Accordingly, it will be readily apparent to those skilled in the art that still further changes and modifications in the actual implementation of the concepts described herein can readily be made without departing from the spirit and scope of the invention as defined by the lawful scope of the following claims.

What is claimed is:

1. A method for minimizing unsolicited marketing communications to a plurality of subscribers, comprising the steps of:
    establishing a subscription base of the plurality of subscribers;
    obtaining a contacting party identification for an incoming communication to a selected contact point of a subscriber in the subscription base before the incoming communication is allowed to pass through to the selected contact point;
    comparing the contacting party identification with a marketing database containing a plurality of marketing contacting party identifications to determine if there is a match between the contacting party identification and any of the plurality of marketing contacting party identifications, and then,
        if there is no match, completing the incoming communication, keeping a record of the contacting party identification, allowing the subscriber to designate the incoming communication as a marketing communication, and adding the contacting party identification into the marketing database if a preselected criterion for addition is met once more than one subscriber identifies the contacting party identification as a potential marketing communication;
    wherein the incoming communication to the selected contact point will not be completed if there is a match unless an override condition is set.

2. The method as recited in claim 1, wherein a portion of the plurality of marketing contacting party identifications in the marketing database is periodically deleted and contacting party identifications in said portion are then again added to the marketing database once the preselected criterion for addition has been met.

3. The method as recited in claim 2, wherein the marketing database includes contacting party identification obtained from more than one source.

4. The method as recited in claim 1, wherein a party other than the subscriber can set the override condition.

5. The method as recited in claim 1, comprising the further step of:
    allowing the subscriber to access a customized subscriber database via a computer and selectively varying one or more override conditions for at least one marketing contacting party identification contained within the customized subscriber database, wherein the customized subscriber database is generated, at least in part, from the marketing database.

6. A method as recited in claim 1, wherein the subscriber is allowed to selectively vary an override condition for a selected group of marketing contacting party identifications.

7. A computer network with an anti-marketing feature, comprising:
    a networked system;
    a subscription base of a plurality of subscribers connected to the networked system;

a logical marketing database containing a plurality of marketing contacting party identifications;

a subscriber marketing identification mechanism that allows a subscriber to identify a contacting party identification as a potential marketing contact;

marketing identification logic that adds the potential marketing contact to the logical marketing database as one of the plurality of marketing contacting party identifications if a preselected criterion for addition is met once more than one subscriber identifies the potential marketing contact as a potential marketing contact; and a control system that takes preselected action other than completing a communication from one of the plurality of marketing contacting party identifications to one of the plurality of subscribers when an incoming communication to any of the plurality of subscriber phone lines is identified as being from any of the plurality of marketing contacting party identifications and an override condition is not set.

8. An anti-marketing system for use in a network, comprising:

a subscription base of a plurality of subscriber contact points;

a logical marketing database containing a plurality of marketing contacting party identifications;

a subscriber marketing identification mechanism that allows a subscriber to identify a contacting party identification as a potential marketing contacting party identification;

marketing identification mechanism that can add an identified potential marketing contacting party identification to the logical marketing database as one of the plurality of marketing contacting party identifications if a preselected criterion for addition is met once more than one subscriber identifies the potential marketing contacting party identification as a potential marketing contacting party identification; and a control system that takes a preselected action other than completing a communication from one of the plurality of marketing contacting party identifications to one of the plurality of subscribers when the contacting party identification is identified as originating from one of the plurality of marketing contacting party identifications.

9. The system recited in claim 8, further comprising:

marketing database control logic that deletes a preselected portion of the plurality of marketing contacting party identifications from the logical marketing database after a given time interval.

10. The system recited in claim 9, further comprising: marketing database control logic that deletes a preselected portion of the plurality of marketing contacting party identifications from the logical marketing database after a given time interval.

11. The method as recited in claim 1, wherein a portion of the plurality of marketing a contacting party identifications in the marketing database is periodically deleted solely in response to the passage of a given time interval and contacting party identifications in said portion are then again added to the marketing database once the preselected criterion for addition has been met.

* * * * *